US 8,065,869 B2

(12) United States Patent
Odendall

(10) Patent No.: US 8,065,869 B2
(45) Date of Patent: Nov. 29, 2011

(54) METHOD FOR DETERMINING THE CONVERSION PERFORMANCE OF AN OXYGEN STORAGE-CAPABLE CATALYTIC CONVERTER OF AN INTERNAL COMBUSTION ENGINE

(75) Inventor: Bodo Odendall, Lenting (DE)

(73) Assignee: Audi AG, Ingolstadt (DE)

( * ) Notice: Subject to any disclaimer, the term of this patent is extended or adjusted under 35 U.S.C. 154(b) by 887 days.

(21) Appl. No.: 11/902,698

(22) Filed: Sep. 25, 2007

(65) Prior Publication Data

US 2008/0082249 A1 Apr. 3, 2008

(30) Foreign Application Priority Data

Sep. 29, 2006 (DE) .......................... 10 2006 046 178

(51) Int. Cl.
*F01N 3/00* (2006.01)
*F01N 3/10* (2006.01)
(52) U.S. Cl. ................. 60/277; 60/274; 60/285; 60/301
(58) Field of Classification Search ...................... 60/274, 60/277, 285, 301
See application file for complete search history.

(56) References Cited

U.S. PATENT DOCUMENTS 6,721,649 B2 * 4/2004 Knott et al. ................... 701/114
2003/0070419 A1 * 4/2003 Kako et al. ....................... 60/274

FOREIGN PATENT DOCUMENTS

DE 10 2004 008 172 10/2005

* cited by examiner

*Primary Examiner* — Thomas Denion
*Assistant Examiner* — Michael Carton
(74) *Attorney, Agent, or Firm* — Novak Druce & Quigg LLP

(57) ABSTRACT

In a method for determining the conversion performance of an oxygen storage-capable catalytic converter of an internal combustion engine, it is proposed that the catalytic converter be supplied with a stoichiometric exhaust gas composition, a known emission change is briefly undertaken and at the same time the signals of a lambda probe located downstream from the catalytic converter are detected so that based on the emission change and signals of the lambda probe a differentiated conclusion about the conversion performance of the catalytic converter for the pollutants hydrocarbon HC and nitrogen oxides NOx is delivered. According to the invention a simple and cost-effective method for differentiation of the pollutants hydrocarbon HC and nitrogen oxides NOx and thus for carrying out an improved diagnosis method is made available.

4 Claims, 1 Drawing Sheet

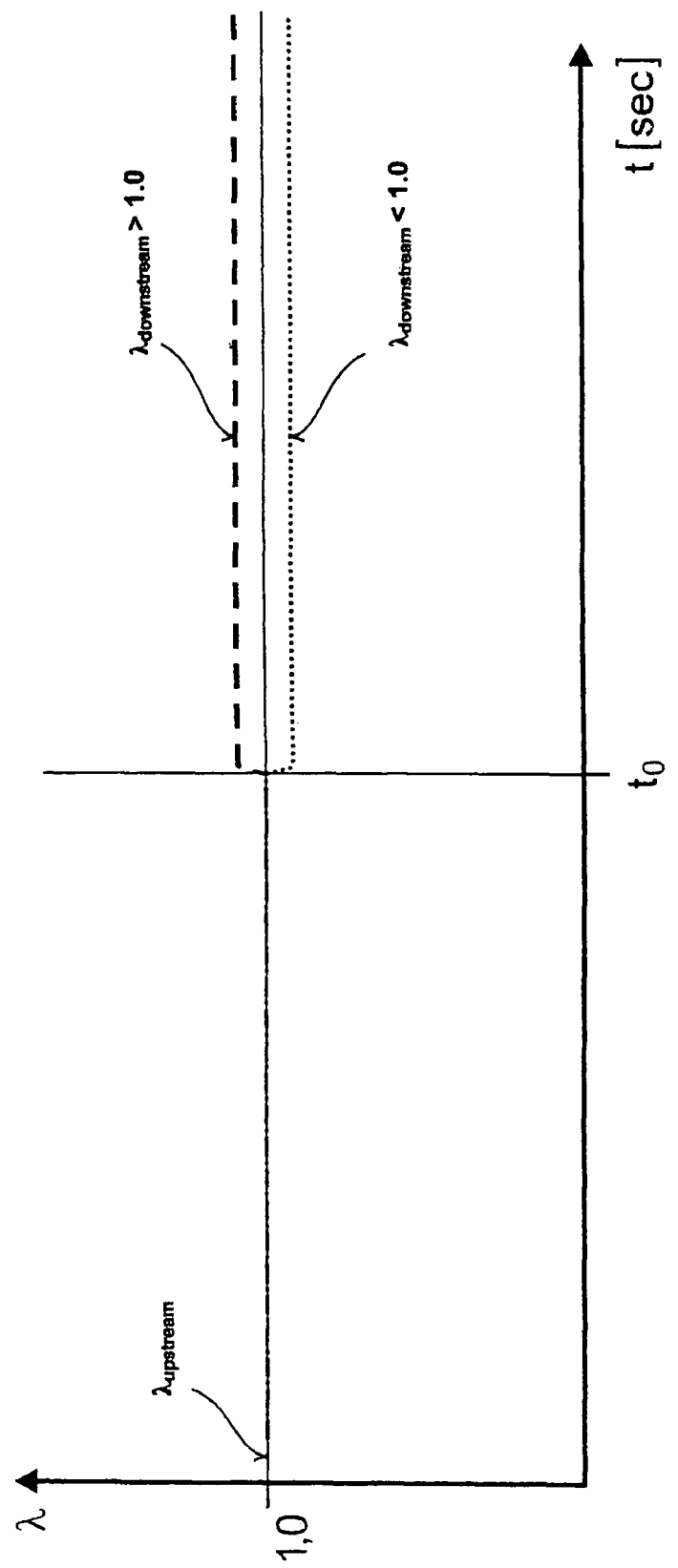

METHOD FOR DETERMINING THE CONVERSION PERFORMANCE OF AN OXYGEN STORAGE-CAPABLE CATALYTIC CONVERTER OF AN INTERNAL COMBUSTION ENGINE

CROSS-REFERENCE TO RELATED APPLICATIONS

This application claims priority from German Application No. 102006046178.9 filed Sep. 29, 2006, hereby incorporated by reference in its entirety.

This invention relates to a method for determining the conversion performance of an oxygen storage-capable catalytic converter of an internal combustion engine.

BACKGROUND OF THE INVENTION

To meet increasingly stringent exhaust standards it is necessary to differentiate the conversion performance with respect to the pollutants hydrocarbons (HC) and nitrogen oxides (NOx) to enable the corresponding diagnosis.

This differentiation can be done for example by introducing special pollutant concentration sensors into the exhaust system. Document DE 198 11 574 A1 mentions such pollutant concentration sensors which are made as planar exhaust sensors and indicate the change of the electrical conductivity of a metal oxide as the measurement signal or use a solid electrolyte as the measurement element. Placement of these pollutant concentration sensors for HC and Nox at positions upstream and downstream from a catalytic converter however constitutes a very expensive solution.

SUMMARY OF THE INVENTION

Against this background, the object of this invention is to make available a method for determining the conversion performance of an oxygen storage-capable catalytic converter of an internal combustion engine which can be done easily and economically.

This object is achieved by supplying the catalytic converter to a stoichiometric exhaust gas composition, a known emission change being briefly undertaken upstream from the catalytic converter and at the same time the signals of a lambda probe located downstream from the catalytic converter being detected so that based on the emission change and signals of the lambda probe a differentiated conclusion about the conversion performance of the catalytic converter for the pollutants hydrocarbon HC and nitrogen oxides NOx is delivered. In the process, the maximum possible pollutant conversions are achieved by the oxygen balance obtained by the stoichiometric exhaust gas composition. And by undertaking the known emission change the lambda probe delivers a genuinely conclusive signal for determining the conversion performances.

If the signals of the lambda probe remain constant or the signal change remains at least below a given threshold, uniform conversion performances of the catalytic converter for different pollutants are assumed, i.e., especially for conversion of hydrocarbon HC and nitrogen oxides Nox.

If conversely a sudden change which exceeds a given threshold occurs in the signals of the lambda probe, nonuniform conversion performances of the catalytic converter for the pollutants hydrocarbon HC and nitrogen oxides Nox are assumed.

In this connection, a positive value of the signal change which corresponds to leaning of the exhaust gas composition indicates that oxidation of the pollutants is proceeding better or more quickly than reduction, so that there is overall better conversion of the hydrocarbon HC than the nitrogen oxides Nox.

Conversely a negative value of the signal change which corresponds to greater richness of the exhaust gas composition indicates that oxidation is proceeding worse or more slowly than reduction so that there is overall poorer conversion of the hydrocarbon HC than the nitrogen oxides Nox.

By preference the respective degree of conversion performance for hydrocarbon HC on the one hand and for nitrogen oxides Nox on the other is derived from the value of the signal change. This respective degree of conversion performance is then compared to given maximum allowable boundary values and used for diagnosis of the catalytic converter. Then a differentiated diagnosis of the conversion performance of the catalytic converter for hydrocarbon HC and nitrogen oxides Nox is thus accomplished.

Advantageously the known change of emissions upstream from the catalytic converter is achieved by turning the exhaust gas recirculation on or off. This is due to the fact that when the exhaust gas recirculation is turned on or off the change in the proportions of emissions can be easily determined. In this connection turning off the exhaust gas recirculation causes a clear rise of nitrogen oxides Nox, conversely turning on the exhaust gas recirculation causes a distinct decrease of the nitrogen oxides Nox.

BRIEF DESCRIPTION OF THE DRAWINGS

This invention will be detailed with reference to the following figure.

FIG. 1 is a graph illustrating the lambda value $\lambda_{upstream}$, $\lambda_{downstream}$ upstream and downstream from a catalytic converter to be diagnosed over time t for the conversion performances of hydrocarbon HC and nitrogen oxides NOx.

DETAILED DESCRIPTION OF AN EMBODIMENT OF THE INVENTION

To carry out the proposed method, the catalytic converter is supplied with a stoichiometric exhaust gas composition so that a first lambda probe which is optionally connected upstream from the catalytic converter would display a lambda value $\lambda_{upstream}=1.0$. Alternatively this lambda value could also be obtained from a model computation including various operating parameters of the internal combustion engine.

If the catalytic converter is a new catalytic converter which ideally has a uniform conversion performance of about 99.9% among other things for hydrocarbon HC and nitrogen oxides NOx, 0.1% of the pollutants would arrive downstream from the catalytic converter. This means that the exhaust gas composition downstream from the catalytic converter would likewise be stoichiometric and that a second lambda probe connected downstream from the catalytic converter would likewise display a lambda value $\lambda_{downstream}=1.0$.

In the case, in which the catalytic converter is no longer new or the catalytic converter has nonuniform conversion for the arriving pollutants, that is, for example conversion of 99.8% for nitrogen oxides NOx and conversion of 99.9% for the other pollutants, downstream from the catalytic converter 0.2% of the nitrogen oxides NOx and 0.1% of the other pollutants are established. On the basis of this composition the lambda probe connected downstream from the catalytic converter would display a lambda value $\lambda_{downstream}>1.0$. This corresponds to a minor change to a richer mixture.

Conversely, in the case in which the catalytic converter has conversion for the hydrocarbon HC of 99.8% and conversion of 99.9% for the other pollutants, in which downstream from the catalytic converter 0.2% of the hydrocarbon HC and 0.1% of the other pollutants are established. And on the basis of this composition the lambda probe connected downstream from the catalytic converter displays a lambda value $\lambda_{downstream}<1.0$. This corresponds to a minor change to a leaner mixture.

So that this effect is intensified, i.e., can be more clearly measured and exceeds given threshold values, at this point upstream from the catalytic converter at time $t_0$ a change of the emissions is effected. But by changing the emissions matching of lambda is necessary to continue to supply the catalytic converter with a stoichiometric exhaust gas composition.

If for example the proportion of nitrogen oxides NOx is increased as the change of emissions, the lambda probe connected downstream from the catalytic converter with nonuniform conversion shows a very distinct change of the voltage signal. With degraded conversion for nitrogen oxides NOx a clearly richer state is established so that the lambda probe indicates a lambda value $\lambda_{downstream}>1.0$. And with degraded conversion for hydrocarbons HC a clear leaning is established so that the lambda probe indicates a lambda value $\lambda_{downstream}<1.0$.

If conversely the proportion of the hydrocarbon HC is increased, the lambda probe connected downstream from the catalytic converter likewise shows a distinct signal change. Thus with degraded conversion for nitrogen oxides NOx a clearly richer state is established, that is, a lambda value $\lambda_{downstream}<1.0$ and with degraded conversion for hydrocarbons HC a clear leaning is established, that is, a lambda value $\lambda_{downstream}>1.0$.

Thus differentiated determination of the conversion performance for the hydrocarbons HC which are formed in oxidation and for the nitrogen oxides NOx which are formed in reduction can be undertaken from the known change of emissions and from the change of the lambda signal $\Delta\lambda$ of the lambda probe connected downstream from the catalytic converter.

The degree of the respective conversion performance can also be determined from the emission change upstream and the lambda change $\Delta\lambda$ downstream from the catalytic converter. And this degree of the respective conversion performance can be compared to the given maximum allowable boundary values.

The invention claimed is:

1. A method for determining the conversion performance of an oxygen storage-capable catalytic converter of an internal combustion engine, the method comprising
supplying the catalytic converter with a stoichiometric exhaust gas composition,
causing a known emission change upstream from the catalytic converter by reversing an on/off state of exhaust gas recirculation, while simultaneously detecting the signals of a lambda probe located downstream from the catalytic converter, and
based on the emission change and at least one signal of the lambda probe, delivering a differentiated conclusion about the conversion performance of the catalytic converter for the pollutants hydrocarbon HC and nitrogen oxides NOx.

2. The method according to claim 1, wherein when the at least one signal of the lambda probe remains constant, uniform conversion performances of the catalytic converter for pollutants hydrocarbon HC and nitrogen oxides NOx are assumed.

3. The method according to claim 1, wherein when a sudden signal change occurs, nonuniform conversion performances of the catalytic converter for the pollutants hydrocarbon HC and nitrogen oxides NOx are assumed, a positive value of the signal change which corresponds to leaning of the exhaust gas composition indicating better conversion of the hydrocarbon HC than the nitrogen oxides NOx, and a negative value of the signal change which corresponds to greater richness of the exhaust gas composition indicating poorer conversion of the hydrocarbon HC than the nitrogen oxides NOx.

4. The method according to claim 3, wherein the respective degree of conversion of the hydrocarbon HC and the nitrogen oxides NOx is derived from the value of the signal change.

* * * * *